(12) United States Patent
Belikovetsky et al.

(10) Patent No.: US 10,511,648 B1
(45) Date of Patent: Dec. 17, 2019

(54) METHOD AND SYSTEM FOR RECONSTRUCTING MEDIA STREAMS

(71) Applicant: CYBERTOKA Ltd., Tel-Aviv (IL)

(72) Inventors: Sofia Belikovetsky, Petah Tikva (IL); Baruch Weizman, Haifa (IL)

(73) Assignee: CYBERTOKA LTD, Tel Aviv (IL)

( * ) Notice: Subject to any disclaimer, the term of this patent is extended or adjusted under 35 U.S.C. 154(b) by 0 days.

(21) Appl. No.: 16/520,678

(22) Filed: Jul. 24, 2019

(51) Int. Cl.
*G06F 15/16* (2006.01)
*H04L 29/06* (2006.01)

(52) U.S. Cl.
CPC .......... *H04L 65/607* (2013.01); *H04L 65/602* (2013.01); *H04L 65/608* (2013.01)

(58) Field of Classification Search
CPC ....... H04L 41/02; H04L 65/60; H04L 65/601; H04L 69/22; H04L 65/607; H04L 65/602; H04L 65/608
See application file for complete search history.

(56) References Cited

U.S. PATENT DOCUMENTS

| | | | |
|---|---|---|---|
| 2003/0159143 A1* | 8/2003 | Chan .................. | H04N 5/45 725/41 |
| 2008/0267217 A1* | 10/2008 | Colville .............. | H04L 47/10 370/477 |
| 2014/0079297 A1* | 3/2014 | Tadayon ............. | G06K 9/00 382/118 |
| 2016/0241890 A1* | 8/2016 | Park .................... | H04N 21/234 |

\* cited by examiner

*Primary Examiner* — John B Walsh
(74) *Attorney, Agent, or Firm* — Mark M. Friedman (57) ABSTRACT

Systems and methods are provided for the reconstruction of a video and audio recording of stored or transmitted media streams, using a proprietary file format or protocol.

19 Claims, 6 Drawing Sheets

| H1 | D1 | T1 | H2 | D2 | T2 |
|----|----|----|----|----|----|

Original 201

| H1a | D1 | T1 | H2a | D2 | T2 |
|-----|----|----|-----|----|----|

Modified A 202a

| D1 | T1b | H2b | D2 | T2 |
|----|-----|-----|----|----|

Modified B 202b

| H1 | D1 | T1 | H2 | D2 | T2 |
|----|----|----|----|----|----|

Reconstructed 203

METHOD AND SYSTEM FOR RECONSTRUCTING MEDIA STREAMS

TECHNICAL FIELD

The present invention is directed to systems and methods for reconstructing a media stream from two media streams.

BACKGROUND OF THE INVENTION

There are presently multiple standards for the encoding, compression, storage and transmission of video and audio. One common standard is H.264 or MPEG (Moving Picture Experts Group)-4 Part 10, Advanced Video Coding (MPEG-4 AVC), which is defined, for example, in https://www.itu.int/rec/T-REC-H.264 as well as in subsequent and previous documents. High Efficiency Video Coding (HEVC), also known as H.265 and MPEG-H Part 2 is another standard experiencing a rapid growth in popularity, and extends and aims to replace H.264.

These and similar standards are widely used by different appliances, such as those which function as video cameras and/or microphones, to capture video and/or audio and encode the video and/or audio based on the aforementioned standards. These appliances sometimes store or transmit the result of such encoding using their own proprietary network protocols or file formats. This renders any captured transmission or file unusable to a second application or device that is not privy to the details of the proprietary network protocols and file formats of the audio and/or video. This is especially true in cases where the proprietary network protocol or file format add their own headers or trailers.

Media streams, are, for example, transmitted over networks, such as packet switched networks, which utilize network layer protocols such as the Internet Protocol (IP). Media streams are also transmittable over networks using transport protocols such as Transmission Control Protocol (TCP), User Datagram Protocol (UDP) or Stream Control Transmission Protocol (SCTP). The aforementioned networks may be, for example, local area networks (LAN) or wide area networks (WAN), such as the Internet. The aforementioned networks may employ wired and/or wireless connections, with the wireless connections, for example, WiFi® and/or cellular connections. The media streams may be encrypted. For example, when encrypted, the encryption may be performed at any one of multiple levels including: 1) separate encryption of all or some of the media elements; 2) at the transport level using such protocols such as Transport Layer Security (TLS), Datagram Transport Layer Security (DTLS) and the like; 3) at the network level using such protocols such as Internet Protocol security (IPsec) and the like; and, 4) at the link level using such protocols such as Wired Equivalent Privacy (WEP), Wi-Fi Protected Access (WPA), Global System for Mobile Communications (GSM) encryption and the like.

The media streams can also be stored either ephemerally or for longer periods of time on non-transitory computer readable storage media. This storage media, for example, could be physically or communicatively coupled with video cameras or microphones, which originally captured the video or audio content. In such a case, the media stream may be stored on the non-transitory computer readable storage device using a computer readable file system, which, for example, is based on file system formats such as New Technology File System (NTFS) from Microsoft of Redmond Wash., File Allocation Table (FAT), Extended File Allocation Table (exFAT), Second Extended File System (ext2) (a file system for the Linux kernel), Third Extended File System (ext3) (a journaled file system for the Linux kernel), Fourth Extended File System (ext4) (a journaling file system for Linux, developed as the successor to ext3), Universal Disk Format (UDF), XFS (a high-performance 64-bit journaling file system created by Silicon Graphics, Inc (SGI)), ISO9660 and the like. Moreover, when stored on a file system, the media stream may be stored in a single file, span multiple files, or stored as a single or multiple files inside a file archive utilizing an archive format such as ZIP, TAR or RAR. Also, the media stream may span multiple physical storage devices as well as multiple file systems. The media streams are storable as encrypted, in plaintext or partially encrypted. The encryption of the media streams may be performed at levels including: 1) separate encryption of all or some of the media elements; 2) at the file level, where the entire file is encrypted; 3) at the directory level, where the entire directory or multiple directories are encrypted; 4) at the file system level, where the entire file system is encrypted; and, 5) at the medium level, where the entire non-transitory computer readable storage medium is encrypted.

There exist many appliances that capture or receive video and/or audio content as media streams, and transmit or store these video streams with conventional transmission and storage media. Many of these appliances utilize their own proprietary protocols and/or file formats to transmit or store a modified representation of the media streams.

These proprietary protocols and/or file formats normally encapsulate the media streams and modify it in ways, such as: 1) they could add their own headers at the beginning of elements of the media stream; 2) they could add their own trailers at the end of elements of the media stream; 3) they could remove some of the original streaming media headers and/or trailers; and, 4) they could insert their own additional content in between different elements of the original media stream. The additional headers and/or trailers could have fixed lengths or could vary in length.

However, these modifications have drawbacks. The greatest drawback is that the modified media stream rendered could be unintelligible to any system or process that is not privy to the details of the proprietary protocols and/or file formats.

SUMMARY OF THE INVENTION

The present invention relates to methods and systems that allow the reconstructions of a media stream, for example, a standard video and/or audio stream, out of a proprietary network protocol transmission carrying video and/or audio, or from a file that utilizes a proprietary format in which the video and/or audio is stored. This is achieved by the present invention without having any specific knowledge as to the proprietary network protocol or file format of the audio and/or video. The methods and systems of the present invention reconstruct an audio and/or video stream from two or more representations of the original audio and/or video stream.

Embodiments of the invention are directed to a computer-implemented method for reconstructing a media stream. The method comprises obtaining a first modified media stream of an original media stream; obtaining a second modified media stream of the original media stream; normalizing the first and second modified media streams to create corresponding normalized first and second media streams; and, aligning the first and second normalized media streams. The alignment is to: identify standard headers and standard trailers in at least the first normalized media stream; identify a media data payload in at least the first normalized media stream; and, identify proprietary headers and proprietary trailers in at least the first normalized media stream. Based on the identifications from the alignment of the first and second normalized media streams, the original media stream is reconstructed. The reconstructed media stream is such that it can be transmitted over communications networks such as the Internet for storage remotely, or stored locally.

Optionally, the computer-implemented method is such that it additionally comprises: outputting the reconstructed media stream.

Optionally, the computer-implemented method is such that the reconstructed media stream includes the identified: 1) standard headers; 2) standard trailers; and, 3) media data payloads.

Optionally, the computer-implemented method is such that it additionally comprises: replacing the identified proprietary headers with replacement standard headers; and/or replacing the identified proprietary trailers with replacement standard trailers; and, the reconstructed media stream includes the identified: 1) standard headers, 2) standard trailers, 3) media data payloads, and 4) replacement standard headers.

Optionally, the computer-implemented method is such that the first modified media stream and the second modified media stream each include transmitted modified media streams.

Optionally, the computer-implemented method is such that the first modified media stream and the second modified media stream each include stored modified media streams.

Optionally, the computer-implemented method is such that the at least one of the first modified media stream or the second modified media stream includes a transmitted modified media stream, and, the other of the first modified media stream or the second modified media stream includes a stored modified media stream.

Optionally, the computer-implemented method is such that it addi9. The method of claim 1, wherein the original media stream, the first modified media stream and the second modified media stream include at least one of: audio content, video content and/or audio and video content.

Embodiments of the invention are directed to a computer usable non-transitory storage medium having a computer program embodied thereon for causing a suitably programmed system to reconstruct a media stream from at least two modified media streams, by performing the following steps when such program is executed on the system. The steps comprise: obtaining a first modified media stream of an original media stream; obtaining a second modified media stream of the original media stream; normalizing the first and second modified media streams to create corresponding normalized first and second media streams; and, aligning the first and second normalized media streams. The aligning is performed to: identify standard headers and standard trailers in at least the first normalized media stream; identify a media data payload in at least the first normalized media stream; and, identify proprietary headers and proprietary trailers in at least the first normalized media stream. The original media stream is reconstructed based on the identifications from the alignment of the first and second normalized media streams.

Optionally, the computer-usable non-transitory storage medium is such that the reconstructed media stream includes the identified: 1) standard headers; 2) standard trailers; and, 3) media data payloads.

Optionally, the computer-usable non-transitory storage medium is such that the steps additionally comprise: replacing the identified proprietary headers with replacement standard headers; and/or replacing the identified proprietary trailers with replacement standard trailers; and, the reconstructed media stream includes the identified: 1) standard headers, 2) standard trailers, 3) media data payloads, and 4) replacement standard headers.

Optionally, the computer-usable non-transitory storage medium is such that the steps additionally comprise: outputting the reconstructed media stream.

Optionally, the computer-usable non-transitory storage medium is such that the first modified media stream and the second modified media stream each include transmitted modified media streams.

Optionally, the computer-usable non-transitory storage medium is such that the first modified media stream and the second modified media stream each include stored modified media streams.

Optionally, the computer-usable non-transitory storage medium is such that at least one of the first modified media stream or the second modified media stream includes a transmitted modified media stream, and, the other of the first modified media stream or the second modified media stream includes a stored modified media stream.

Embodiments of the invention are directed to a computer system for reconstructing a media stream. The computer system comprises: a non-transitory storage medium for storing computer components; and, a computerized processor for executing the computer components. The computer components comprise: a module for obtaining at least a first modified media stream of an original media stream, and, at least a second modified media stream of the original media stream; a module for normalizing the first and second modified media streams to create corresponding normalized first and second media streams; a module for aligning the first and second normalized media streams to: 1) identify standard headers and standard trailers in at least the first normalized media stream; 2) identify a media data payload in at least the first normalized media stream; and, 3) identify proprietary headers and proprietary trailers in at least the first normalized media stream; and, a module for reconstructing the original media stream based on the identifications from the alignment of the first and second normalized media streams.

Optionally, the computer system is such that it additionally comprises: a module for outputting the reconstructed media stream.

Optionally, the computer system is such that it additionally comprises: a module for replacing the identified proprietary headers with replacement standard headers; and/or replacing the identified proprietary trailers with replacement standard trailers.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application" or "software application", includes executable software, and optionally, any graphical user interfaces (GUI), through which certain functionalities can be implemented.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

The present invention provides methods and systems for reconstructing, from two or more media streams, with a standard media stream (the terms "media stream" and "data stream" used interchangeably herein), as the output of the methods and systems. For example, as used herein, a "media stream" includes video and/or audio content.

Figure 1A:
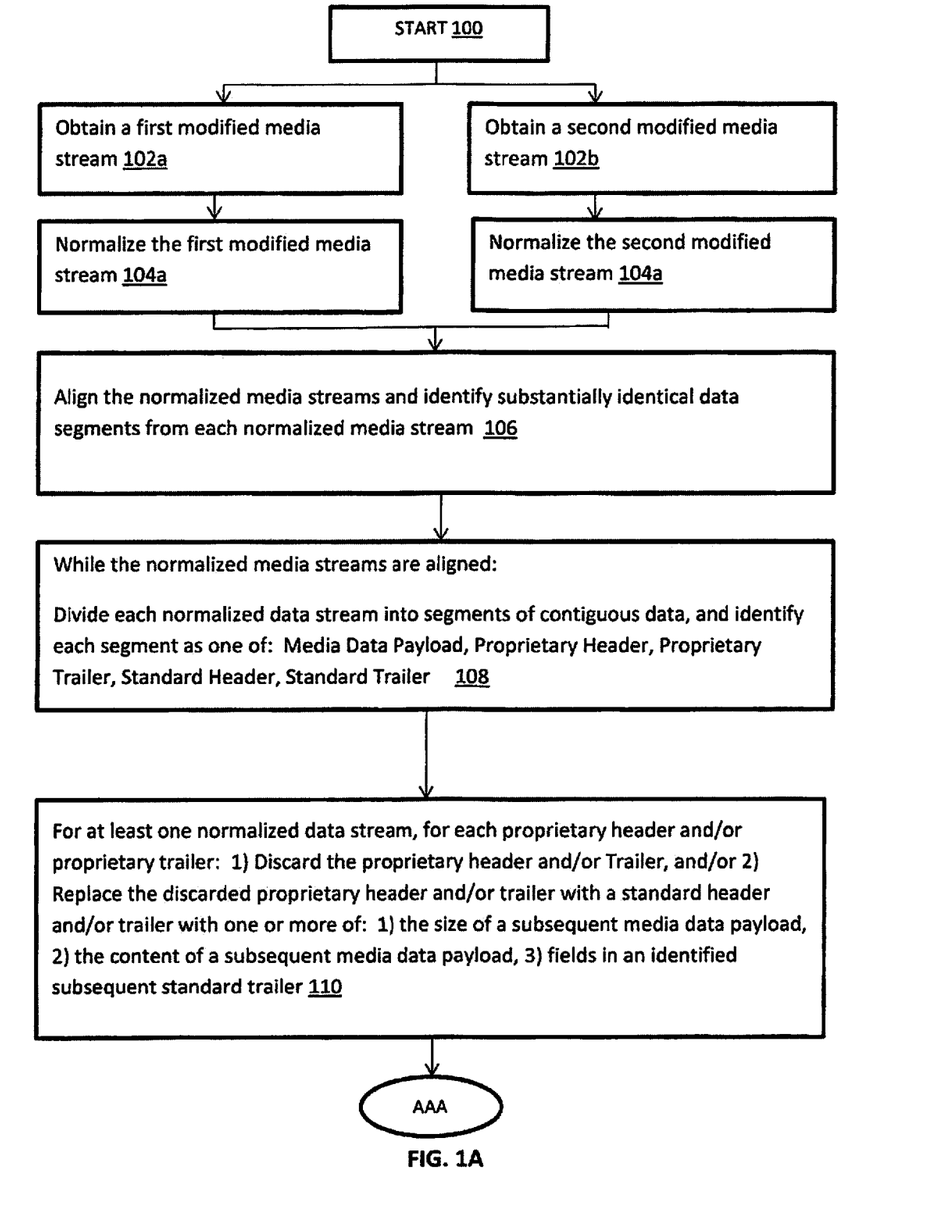
FIGS. 1A and 1B, collectively referred to as hereinafter as FIG. 1, are a flow diagram of a process in accordance with embodiments of the present invention.
Figure 1B:
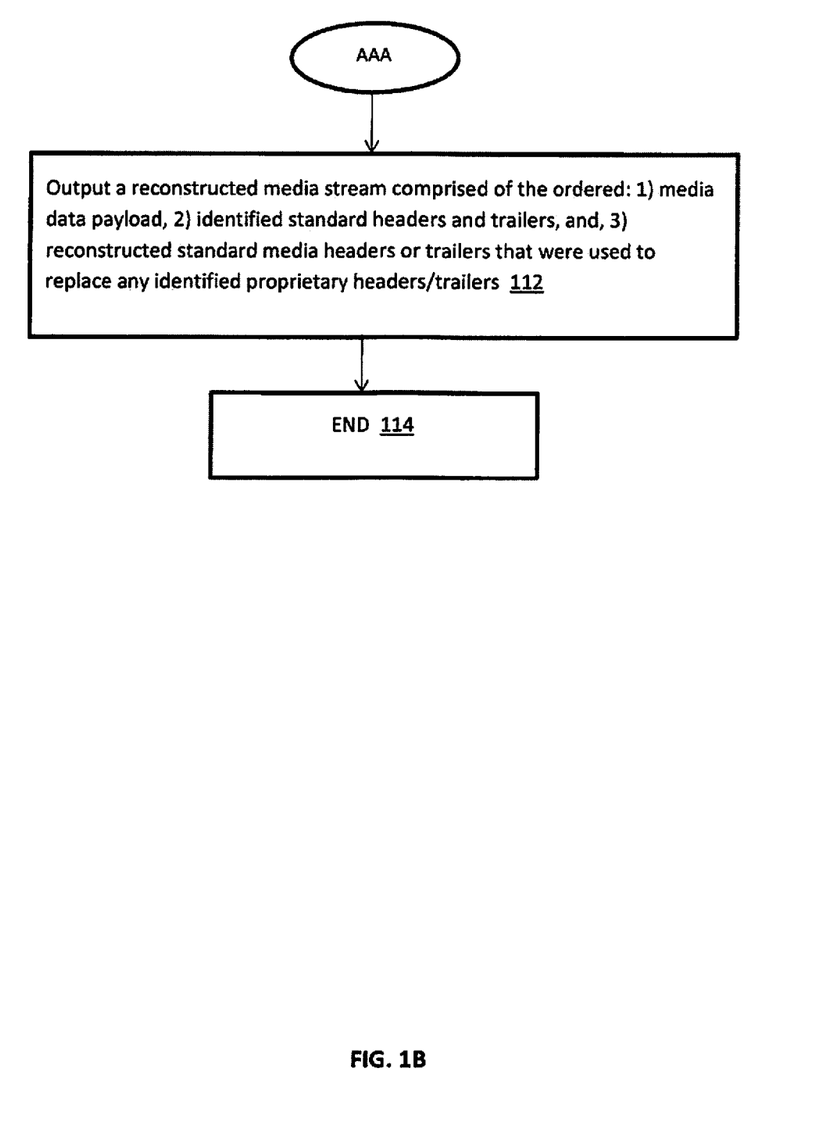
Figure 3A:
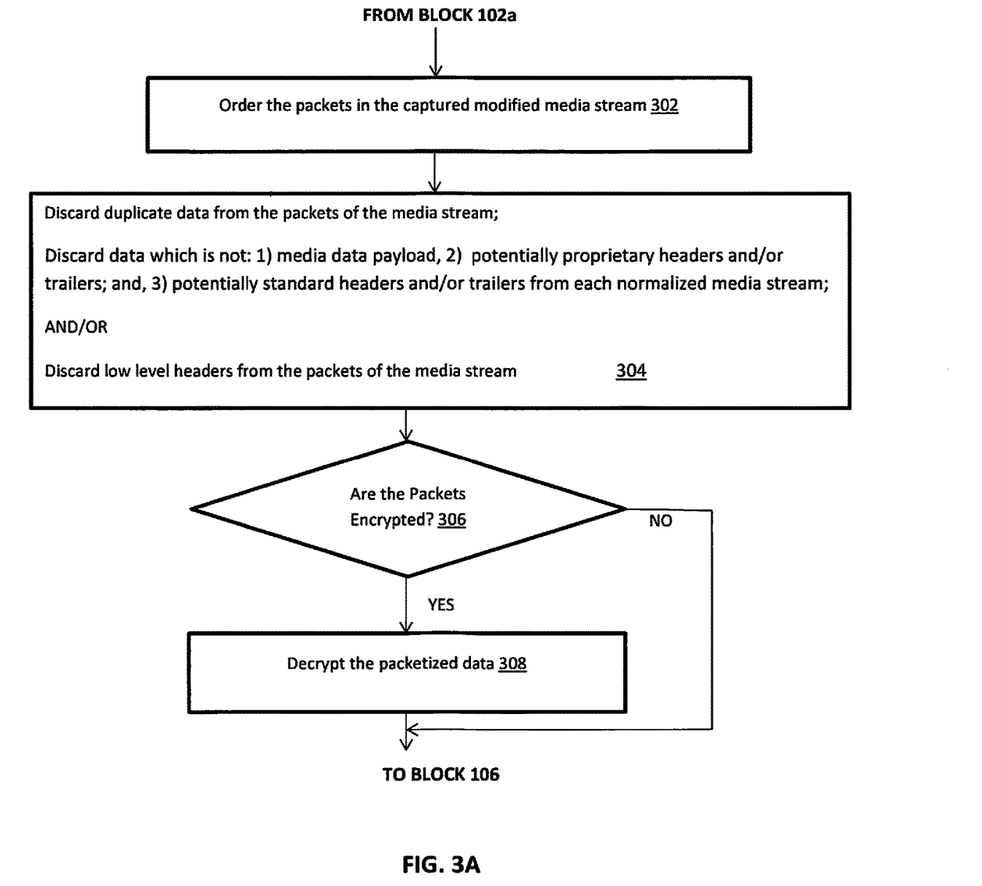
FIGS. 3A and 3B are processes detailing the subprocesses of normalizing the modified media streams from the flow diagram of FIG. 1, and, FIG. 4 is an example apparatus for performing the processes of FIGS. 1, 3A and 3B.
Figure 3B:
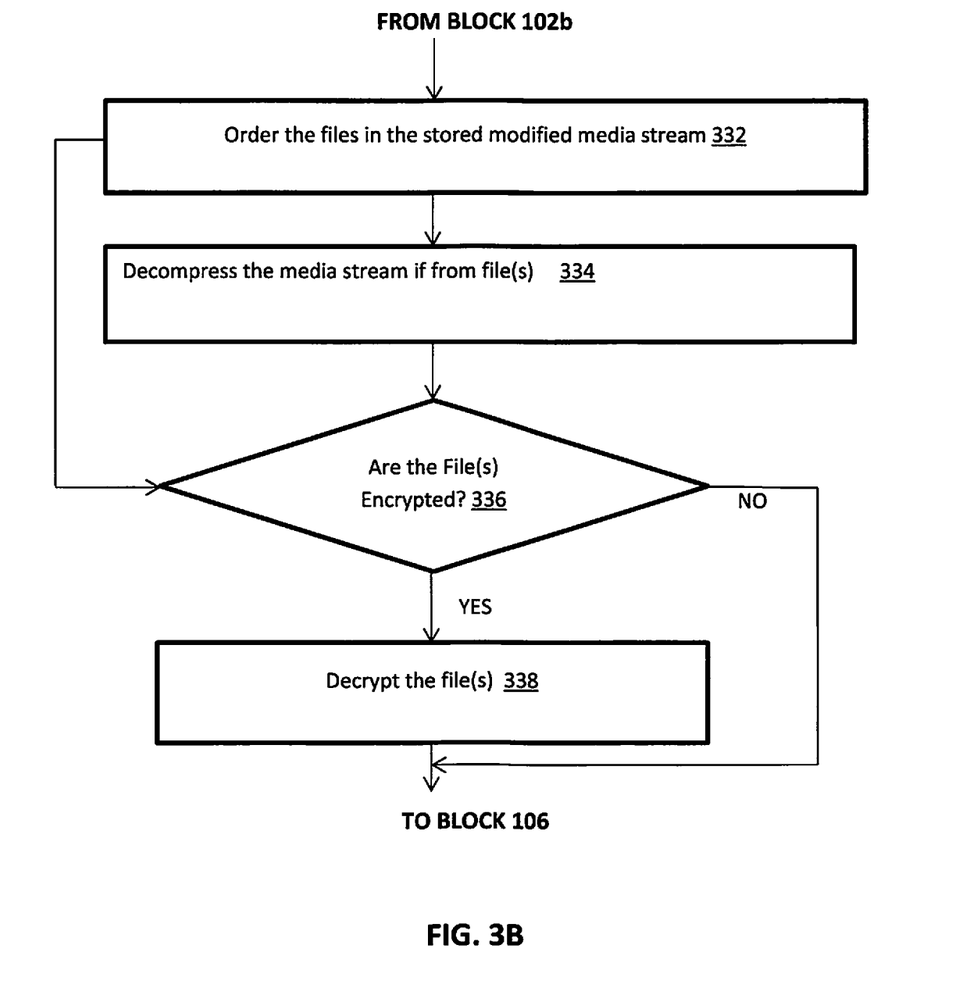

Attention is now directed to FIGS. 1, 3A and 3B, which show flow diagrams detailing computer-implemented processes and sub-processes in accordance with embodiments of the disclosed subject matter. FIG. 1 is a process for reconstructing, from two or more media streams, a standard media stream, as the output of the methods and systems. FIGS. 3A and 3B are detailed processes associated with obtaining the media stream for the process of FIG. 1. The aforementioned processes and sub-processes are, for example, performed automatically and in real time.

The process of FIG. 1 begins at a START block 100. At the START block 100, the user typically has access to a recording device, on which media streams, are recorded and/or stored, a storage device, which stores media streams and/or access to a network, over which media streams can be obtained. The modified media streams, also known as predecessor media streams, which are obtained, as part of the invention and system 400, disclosed herein, are media streams which have been modified by devices which capture and/or store the media streams using their own proprietary protocols and/or file formats. The proprietary protocols and/or file formats modify the media streams in ways, such as: 1) they could add their own headers at the beginning of elements of the media stream; 2) they could add their own trailers at the end of elements of the media stream; 3) they could remove some of the original streaming media headers and/or trailers; and, 4) they could insert their own additional content in between different elements of the original media stream. The additional headers and/or trailers could have fixed lengths or could vary in length.

The process moves to block 102a and block 102b, where two or more modified or predecessor media streams are obtained, for example, contemporaneous in time. For example, a first modified media stream is obtained at block 102a, and a second modified media stream is obtained at block 102b.

The modified media streams are different from each other. These modified media streams may be acquired from multiple sources. For example, one source from which a transmitted modified media stream is acquired, is from processes such as packet capture (by a packet capture device using a network protocol analyzer, such as Wireshark™, available from the Wireshark Foundation). For example, another source, from which a stored modified media stream is acquired is from storage media, which stored modified media streams, which were previously captured by various recording and capture devices.

One possible source of the stream of modified media could be a stream of transmitted modified media. In one embodiment of the present invention a packet processing system is provided with a series of packets belonging to at least one modified media stream. The packets could be accompanied with additional metadata such as the time the packets were captured or transmitted as well as an identifier of where these packets were captured.

The system could optionally perform the actual packet capture by, for example sniffing network traffic through a Switched Port Analyzer (SPAN) port or mirror port.

Alternatively, capturing of the packets can be performed by a different system which is, for example, coupled to the packet processing system either physically or communicatively. The packets could be processed in real time or in a delayed fashion. In the latter case, packets could first be captured and only later provided to the packets processing system either over a network or any other media such as a non-transitory computer readable storage device.

Figure 2:
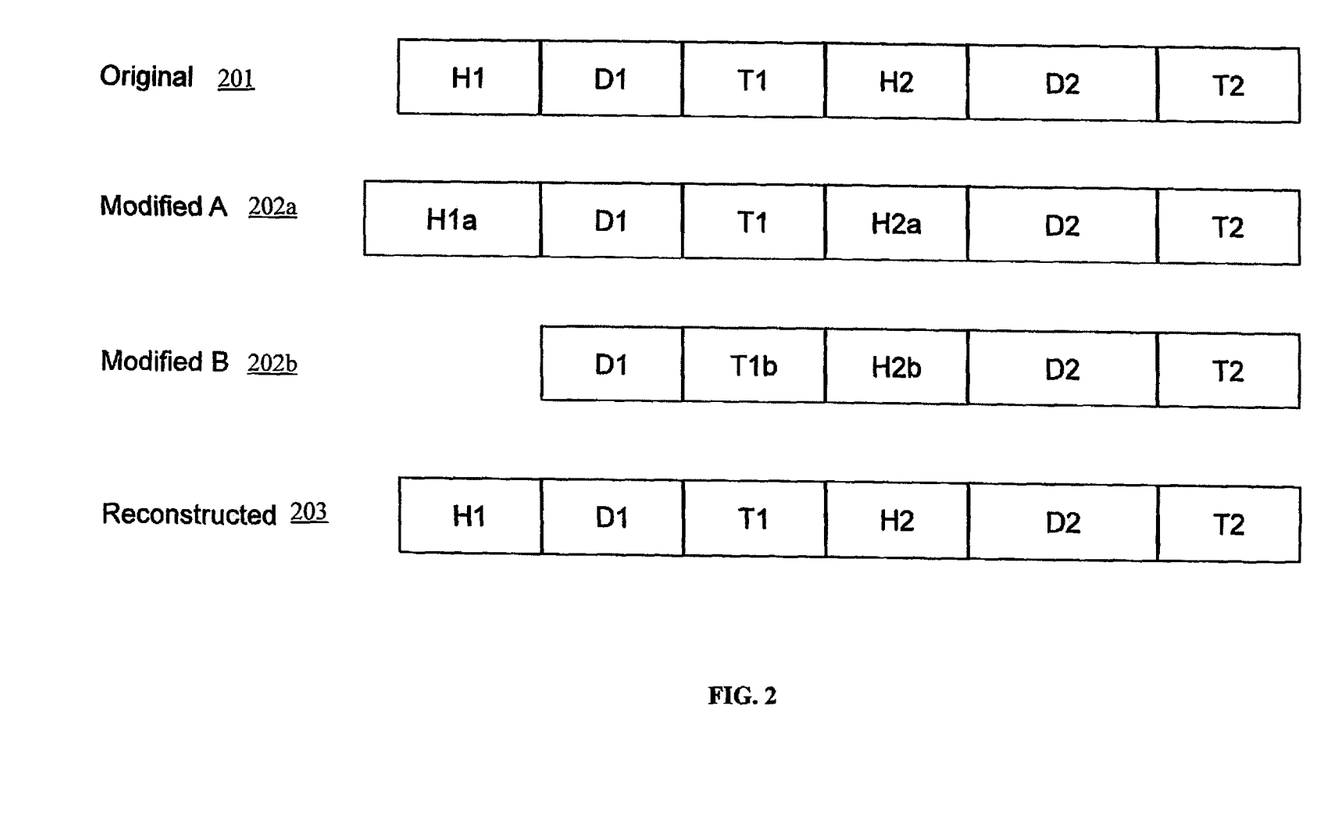
FIG. 2 is a diagram of media streams.

The aforementioned modified media streams are the original media stream 201, as shown in FIG. 2, as modified by the device or system which transmitted and/or stored the original media stream 201. Two example modified media streams, are Modified A 202a, a first modified media stream, also known hereinafter as a first modified representation of an original media stream, of block 102a, and Modified B 202b, a second modified media stream, also known hereinafter as a second modified representation of an original media stream, of block 102b. Modified A and Modified B are modified media streams, as packets or segments include those of "H" for a header, "D" for a media data payload or data payload, and "T" for a trailer, with the ordering of the header, media data payload or trailer indicated by "1" and "2". The packets or segments ending in "a" and "b" are modifications made to the original media stream prior to the respective modified media streams being applied in the processes of the invention, as shown in FIGS. 1, 3A and 3B. From these two modified media streams 202a, 202b, a reconstructed media stream 203, which corresponds to the original media stream 201, is created.

One modified media stream or first modified media stream of block 102a, is, for example, a stream (Modified A) 202. The packets were captured, for example, by a packet processing system, such as a packet capture device using a network protocol analyzer, such as Wireshark™, as detailed above.

The packets which have been captured, in addition to the modified media stream, may include unrelated packets, which belong to other media streams or to a completely unrelated type of traffic. When the packet processing system receives the packets, these packets may be identified as a group of packets belonging to the modified media stream based on, for example, network and transport layer information such as the IP addresses of the original senders and receivers of the packets, the Internet Protocol (IP) being used and additional transport layer information such as Transmission Control Protocol (TCP), User Datagram Protocol (UDP) or Stream Control Transmission Protocol (SCTP) source and destination ports.

A second modified media stream, of block 102b may be a stored media stream, for example, Modified B 202b, based on the original media stream 202.

While the two modified media streams used were one captured modified media stream and one stored modified media stream, the two (or more) modified media streams which may also be used include, for example, two (or more) captured modified media streams, or two (or more) stored modified media streams.

The process moves to block 104a and block 104b, respectively, where, for example, contemporaneous in time, each of the modified media streams are normalized. The modified media streams 202a, 202b are normalized when each stream includes potentially proprietary headers/trailers, potentially standard headers and/or trailers, such standard headers/standard trailers including those used by H.264 or H.265, and a media data payload (e.g., such as video and/or audio).

For example, H.264 and H.265 headers include information about the media stream, such as magic, which indicates the beginning of the header, type of frame, frame numbering of the data payload, and payload size. The of H.264 and H.265 headers are one of three types: 1) beginning headers, which indicate the beginning of a new data payload, 2) regular headers, positioned between the beginning header and the trailer header, and, 3) a trailer header, which indicates the end of the specific data payload.

H.264 and H.265 trailers are typically identifiable, based on these trailers containing a large number of consecutive binary zeros, e.g., approximately 20 binary zeros, at the end of the data payload. Once this trailer is identified, a beginning header of a subsequent media stream typically follows.

Turning to FIG. 3A, which is a block 104a in detail, at block 302, the packets belonging to the modified media stream are ordered. The ordering may, for example, be performed based on the time the packets were captured, or alternatively, based on any sequencing number which provides such information. For example, if the packets arrived using TCP, then TCP sequence information could be used in ordering the packets. Other network and transport layer information such as the IP ID (Identifier) field in the IP header may also be used for ordering the packets.

The process moves to block 304, where duplicate data, such as the result of TCP retransmission is discarded from the modified media stream. This is performed, for example, by discarding data which is not: 1) media data payload; 2) potentially proprietary headers and/or trailers; and 3) potentially standard headers and/or trailers from each normalized media stream; and/or discarding low level headers from the packets of the media stream, such as layer 4 (e.g., TCP), layer 3 (e.g., IP) and layer 2 (e.g., Ethernet).

The process moves to block 306, where should the captured transmitted data be encrypted, at any of the aforementioned layers, the data is decrypted, at block 308. Decryption is performed, for example, by obtaining the necessary cryptographic parameters. These cryptographic parameters include, for example, encryption protocols (e.g., WEP, IPsec, TLS etc.), encryption algorithms (e.g., AES (Advanced Encryption Standard)-128-CBC, as defined in RFC 3602), data authenticity/integrity algorithms (if one is employed), and cryptographic keys.

The methods by which the cryptographic parameters are obtained include, for example, through configuration, trial and error methods, such as attempting to derive the cryptographic parameters based on known data, and by employing a cryptographic algorithm.

From block 308, the modified media stream is now normalized, and the process moves to block 106.

It should be appreciated that although decryption is shown at blocks 306 and 308, after blocks 302 and 304, as the relevant data could have been encrypted at different levels of the protocol stack, the steps provided at blocks 306 and 308 could be performed in any order in the normalization process of FIG. 3A.

Returning to block 306, should the media stream not be encrypted, the modified media stream is now normalized, and the process moves to block 106.

FIG. 3B illustrates a process of block 104b in detail for normalizing a second modified media stream, from block 102b. This second modified media stream is, for example, a stored modified media stream. With the stored modified media stream is obtained, at block 102b, the data of the modified media stream is ordered, at block 332. The ordering is, for example, based on timestamps of files in which the modified media stream is stored. Alternatively, the ordering may be based on the file names that store the modified media stream. For example, if the modified media stream spans multiple files, it could be ordered based on the alphabetical order of names of said files. Additionally, if the modified media stream is stored in one or more archives the modified media stream is extracted from the archive or archives and, if necessary, the modified media stream is decompressed, at block 334.

Decompression is needed if the stream or the file(s) are compressed. After decompression of the stream or the file(s), the process moves from block 334 to block 336.

Returning to block 332, should decompression not be needed, the process moves from block 332 to block 336.

At block 336, the file(s), if encrypted, is/are decrypted, at block 338. To perform such decryption, the necessary cryptographic parameters would be obtained as discussed above for the process of FIG. 3A, with relation to transmitted modified media stream. From block 338, the stored modified media stream is now normalized and the process moves to block 106.

Returning to block 336, should the modified media stream not be encrypted, the stored modified media stream is now normalized and the process moves to block 106.

The process is now at block 106 (FIG. 1), where the normalized media streams are aligned. This alignment is such that a segment of data from one normalized media stream is logically placed next to a substantially identical segment of data from a second normalized media stream, such that the two segments of data that are substantially identical are identified as media data payload. For example, two aligned segments are media data payload, when they match, and are typically 20 bytes (and not binary zeros).

The process moves to block 108, where while the normalized media streams remain aligned, such that standard headers and/or trailers, such standard headers/standard trailers including those used by H.264 or H.265, are identified. The identification is performed, for example, by matching the normalized modified media stream to known patterns of standard headers and/or trailers. Also any segments of data that are not common in the two or more media streams and are not identified as standard headers and/or trailers are identified as proprietary headers and/or trailers. As a result, standard headers and/or trailers, and/or proprietary headers and/or trailers, are identified in each of the normalized media streams.

The normalized media streams are divided into segments of contiguous data. Each segment is identified as one of a: media data payload, proprietary header, proprietary trailer, standard header, or standard trailer.

The process moves to block 110, where at least one of the normalized media streams is selected. For each identified proprietary header/trailer in the selected normalized media stream, the identified proprietary header/trailer is discarded and/or replaced with a standard header/trailer, such as H.264 headers or trailers. The replacement standard header/trailer could be populated using information derived from data (information) including one or more of: 1) the size of a subsequent media data payload; 2) the content of a subsequent media data payload; and, 3) fields in an identified subsequent standard trailer.

Moving to block 112, a reconstructed media stream is output. This reconstructed media stream includes, for example, ordered 1) media data payloads; 2) identified standard headers and trailers; and, 3) reconstructed standard media headers or trailers that were used to replace any identified proprietary headers/trailers. This outputted reconstructed media stream 203 (FIG. 2) is, a media stream corresponding to the original media stream, and for example, is playable or capable of being processed by a standard media stream application.

Figure 4:
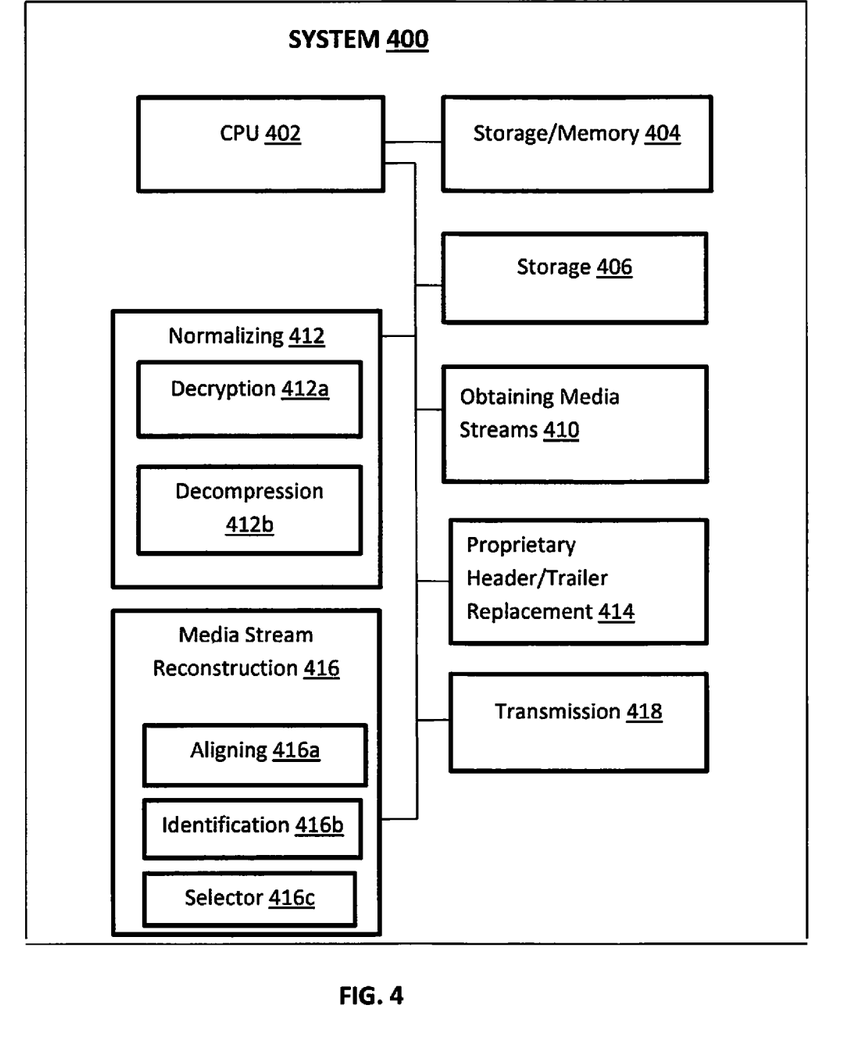

FIG. 4 shows a block diagram of an example of a system 400 for performing the processes and subprocesses of FIGS. 1, 3A and 3B, as detailed above. The system 400 is formed of, for example, one or more of computers, servers, and combinations thereof. The aforementioned one or more of computers, servers, and combinations thereof, are configured to link to networks, so as to be in electronic and/or data communications therewith, in order to obtain the requisite modified media streams and transmit the reconstructed media streams thereover to various network destinations. The system includes components 402, 404, 406, 410, 412, 414, 416, and 418. in electronic and/or data communication with each other, directly or indirectly.

A central processing unit (CPU) 402 performs the processes (methods) of the present invention. For example, the processors may include x86 Processors from AMD and Intel, Xenon® and Pentium® processors from Intel, as well as any combinations thereof. Additional processors, including hardware processors, storage/memory, modules and storage media may also be part of the system for performing the invention.

The storage/memory 404 stores machine-executable instructions executed by the CPU 402 for performing the processes of the invention, for example, those detailed in FIGS. 1, 3A and 3B, which when programmed accordingly into the CPU 402, control the storage media 406 and the modules 410, 412, 414, 416 and 418. The storage/memory 404, for example, also provides temporary storage for the system 400.

The storage media 406 includes conventional storage media for storing the various modified media streams, as well as reconstructed media streams, replacement headers and replacement trailers, as well as other headers and trailers and media data payloads.

The media streams module 410 functions to receive or otherwise obtain both transmitted and stored media streams, and may include sniffers, or other components necessary to obtain the media streams.

A normalizing module or normalizer 412 serves to normalize modified media streams. The module 412 normalizes modified media streams 202a, 202b by identifying media data payloads (e.g., such as video and/or audio) and proprietary headers/trailers, and requesting replacement of proprietary headers/trailers with standard headers and/or trailers, such standard headers/standard trailers including those used by H.264 or H.265, which is performed by module 414 (detailed below). This module 412 includes a decryption module or decrypter 412a and a decompression module or decompressor 412b.

The decryption module or decrypter 412a provides decryption to media streams, including modified media streams and/or normalized media streams, when necessary.

The decompression module 412b provides decompression to media streams, including modified media streams and/or normalized media streams, when necessary.

A header/trailer replacement module or replacer 414 replaces the identified proprietary headers with replacement standard headers; and/or replaces the identified proprietary trailers with replacement standard trailers.

A reconstruction module or reconstructor 416 serves to reconstruct the original media stream or a representation of the original media stream, from the normalized modified media streams. This module 416 includes an alignment module or aligner 416a, which aligns one or more media streams and selects one or more media streams for further processing during and post normalization to be reconstructed, to become a reconstructed media stream. An identification module or identifier 416b serves to identify headers, both standard and proprietary, trailers, both standard and proprietary, and media data payloads. A selection module or selector 416c serves to select one or more of the normalized media streams for further processing.

A transmission module or transmitter 418 serves to transmit the reconstructed media stream, which is now output, to a destination along the network.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment.

Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A computer-implemented method for reconstructing a media stream, comprising:
   obtaining a first modified media stream of an original media stream;
   obtaining a second modified media stream of the original media stream;
   normalizing the first and second modified media streams to create corresponding normalized first and second media streams;
   aligning the first and second normalized media streams to:
      identify standard headers and standard trailers in at least the first normalized media stream;
      identify a media data payload in at least the first normalized media stream; and,
      identify proprietary headers and proprietary trailers in at least the first normalized media stream; and,
   reconstructing the original media stream based on the identifications from the alignment of the first and second normalized media streams.

2. The computer-implemented method of claim 1, additionally comprising: outputting the reconstructed media stream.

3. The computer-implemented method of claim 1, wherein the reconstructed media stream includes the identified: 1) standard headers; 2) standard trailers; and, 3) media data payloads.

4. The computer-implemented method of claim 1, additionally comprising:
   replacing the identified proprietary headers with replacement standard headers; and/or replacing the identified proprietary trailers with replacement standard trailers; and,
   the reconstructed media stream includes the identified: 1) standard headers, 2) standard trailers, 3) media data payloads, and 4) replacement standard headers.

5. The computer-implemented method of claim 4, additionally comprising: outputting the reconstructed media stream.

6. The computer-implemented method of claim 1, wherein the first modified media stream and the second modified media stream include transmitted modified media streams.

7. The computer-implemented method of claim 1, wherein the first modified media stream and the second modified media stream include stored modified media streams.

8. The computer-implemented method of claim 1, wherein at least one of the first modified media stream or the second modified media stream includes a transmitted modified media stream, and, the other of the first modified media stream or the second modified media stream includes a stored modified media stream.

9. The computer-implemented method of claim 1, wherein the original media stream, the first modified media stream and the second modified media stream include at least one of: audio content, video content and/or audio and video content.

10. A computer usable non-transitory storage medium having a computer program embodied thereon for causing a suitably programmed system to reconstruct a media stream from at least two modified media streams, by performing the following steps when such program is executed on the system, the steps comprising:
   obtaining a first modified media stream of an original media stream;
   obtaining a second modified media stream of the original media stream;
   normalizing the first and second modified media streams to create corresponding normalized first and second media streams;
   aligning the first and second normalized media streams to:
      identify standard headers and standard trailers in at least the first normalized media stream;
      identify a media data payload in at least the first normalized media stream; and,
      identify proprietary headers and proprietary trailers in at least the first normalized media stream; and,
   reconstructing the original media stream based on the identifications from the alignment of the first and second normalized media streams.

11. The computer-usable non-transitory storage medium of claim 10, wherein the reconstructed media stream includes the identified: 1) standard headers; 2) standard trailers; and, 3) media data payloads.

12. The computer-usable non-transitory storage medium of claim 11, wherein the steps additionally comprise:

replacing the identified proprietary headers with replacement standard headers; and/or replacing the identified proprietary trailers with replacement standard trailers; and, the reconstructed media stream includes the identified: 1) standard headers, 2) standard trailers, 3) media data payloads, and 4) replacement standard headers.

13. The computer-usable non-transitory storage medium of claim 12, wherein the steps additionally comprise: outputting the reconstructed media stream.

14. The computer-usable non-transitory storage medium of claim 10, wherein the first modified media stream and the second modified media stream include transmitted modified media streams.

15. The computer-usable non-transitory storage medium of claim 10, wherein the first modified media stream and the second modified media stream include stored modified media streams.

16. The computer-usable non-transitory storage medium of claim 10, wherein at least one of the first modified media stream or the second modified media stream includes a transmitted modified media stream, and, the other of the first modified media stream or the second modified media stream includes a stored modified media stream.

17. A computer system for reconstructing a media stream, comprising:

a non-transitory storage medium for storing computer components; and, a computerized processor for executing the computer components comprising:

a module for obtaining at least: a first modified media stream of an original media stream, and, a second modified media stream of the original media stream;

a module for normalizing the first and second modified media streams to create corresponding normalized first and second media streams;

a module for aligning the first and second normalized media streams to:

identify standard headers and standard trailers in at least the first normalized media stream;

identify a media data payload in at least the first normalized media stream;

and, identify proprietary headers and proprietary trailers in at least the first normalized media stream; and, a module for reconstructing the original media stream based on the identifications from the alignment of the first and second normalized media streams.

18. The computer system of claim 17, additionally comprising: a module for outputting the reconstructed media stream.

19. The computer system of claim 17, additionally comprising: a module for replacing the identified proprietary headers with replacement standard headers; and/or replacing the identified proprietary trailers with replacement standard trailers.

* * * * *